July 2, 1940.   L. C. BANNISTER ET AL   2,206,246
MEANS FOR WINDING FLEXIBLE MATERIALS ONTO SPOOLS, BOBBINS, OR THE LIKE
Filed Feb. 27, 1939   2 Sheets-Sheet 1

Inventor
Leonard Charles Bannister
Waldo John Clements
by
Stebbins, Blenko & Parmelee
Attorney July 2, 1940.　　L. C. BANNISTER ET AL　　2,206,246
MEANS FOR WINDING FLEXIBLE MATERIALS ONTO SPOOLS, BOBBINS, OR THE LIKE
Filed Feb. 27, 1939　　2 Sheets-Sheet 2

Inventor
Leonard Charles Bannister
Waldo John Clements
by
Stebbins Blenko Parmelee
Attorney Patented July 2, 1940

2,206,246

UNITED STATES PATENT OFFICE 2,206,246

MEANS FOR WINDING FLEXIBLE MATERIALS ONTO SPOOLS, BOBBINS, OR THE LIKE

Leonard Charles Bannister, St. Helen's and Waldo John Clements, Prescot, England, assignors to British Insulated Cables Limited, Prescot, England, a British company Application February 27, 1939, Serial No. 258,596
In Great Britain March 12, 1938

10 Claims. (Cl. 242—45)

This invention relates to means for winding flexible material in the form of wire, strip or the like onto a holder such as a spool, bobbin or drum (hereinafter referred to as a spool. Winding arrangements in accordance with the invention may be incorporated in machines for preparing or treating the material, for example wire drawing machines, or the invention may be applied to machines used solely for winding material onto spools. It is normally desirable that the speed at which the material is wound onto the spool should be constant. As the amount of material wound on the spool increases the diameter of the cylinder about which the material is being wound increases, and if the spool is driven at a constant speed the rate at which the material is wound onto the spool is progressively increased during the winding operation. It is necessary therefore if a constant speed of winding is desired, to provide means for reducing the speed of rotation of the spool as the amount of material wound thereon increases. It is an object of the present invention to provide improved means for obtaining speed control of this kind.

In accordance with the invention, the spool is mounted in a carriage which is free to move in a fixed path under the action of two forces, the weight of the spool with the material wound thereon, and a biassing force which resists movement of the spool under the action of gravity. The effect of the biassing force is made to increase as a function of the distance moved by the spool from its initial or highest position, so that the carriage takes up a position of equilibrium in which the two forces balance each other. Movement of the frame carrying the spool is adapted to vary the speed of rotation of the spool, for example by controlling the source of power for driving the spool or by altering the ratio of a variable gear between the source of power and the spool. It will be seen that, if the speed of rotation of the spool is a maximum when no material is wound thereon, as material is wound onto the pool it will move downwards under the increasing force of gravity against the biassing force and its speed of rotation will thereby be progressively decreased.

It may also be desirable that the tension of the material being wound onto the spool should be kept constant and equal to a predetermined value. This may be arranged by leading the material onto the spool in such a way that it exerts a force on the spool carriage in the same direction as that due to gravity. The change of biassing force with displacement can then be chosen so that the speed of rotation of the spool is controlled so as to keep the tension in the material constant. If the tension in the material increases owing to an increase in the resistance to the movement of it towards the spool, or due to the winding rate not decreasing proportionately to the increase in the diameter of the spool, since the tension in the material acts similarly to the force of gravity on the spool, the spool will move downwards in such a way as to cause the controlling means to decrease the speed of rotation of the spool and so relieve the extra tension in the material. Similarly, if the tension in the material falls below the normal tension the spool will move upwards in such a way as to cause an increase in the speed of rotation thereof until the tension in the material reaches its normal value. The biassing force may be composed of two forces, a constant force which balances the tension of the material when it has the normal desired value, and a variable force which increases as the displacement of the spool carriage increases.

A convenient method of allowing for movement of the spool is to mount it on a pivoted frame provided with a counterpoise weight to balance the weight of the spool and material. The swinging of the frame about its pivot can then be utilised to control the driving means for the spool in dependence on the position of the frame. In order that the biassing force shall vary according to the position of the frame, the pivot is displaced from, and arranged above, a line joining the centres of gravity of the counterpoise weight and the spool.

In a preferred form of this construction, the variable gear driving the spool is a pair of cone pulleys with a sliding belt and the control of the gear ratio is exercised by an inclined guide engaging the belt and so arranged that the rocking of the frame produces relative movement between the gear and the guide, which causes the shifting of the belt along the pulleys in the sense appropriate for producing the required speed change. The preferable arrangement is that in which the cone pulleys are mounted on the pivoted frame with the spool and the inclined guide is mounted on some stationary part of the apparatus adjacent to the frame so as to engage one or both sides of the belt between the pulleys.

Such an arrangement can have the general form referred to, in which the pivot is displaced from, and arranged above, a line joining the centres of gravity of the counterpoise weight and the spool. The frame can then be considered as consisting of two arms rigidly connected together at the pivot and making an obtuse angle with each other. The counterpoise is mounted on the end of one arm and the spool is carried at the end of the other. The arrangement is such that the arm carrying the counterpoise is horizontal when the spool is in its lowest position. The turning moment exerted by the weight then increases as the spool moves downwards towards this position.

Two machines for winding wire onto spools having means for controlling the speed of rotation of the spool in accordance with the present invention will hereinafter be described as examples with reference to the accompanying drawings.

Figure 1:
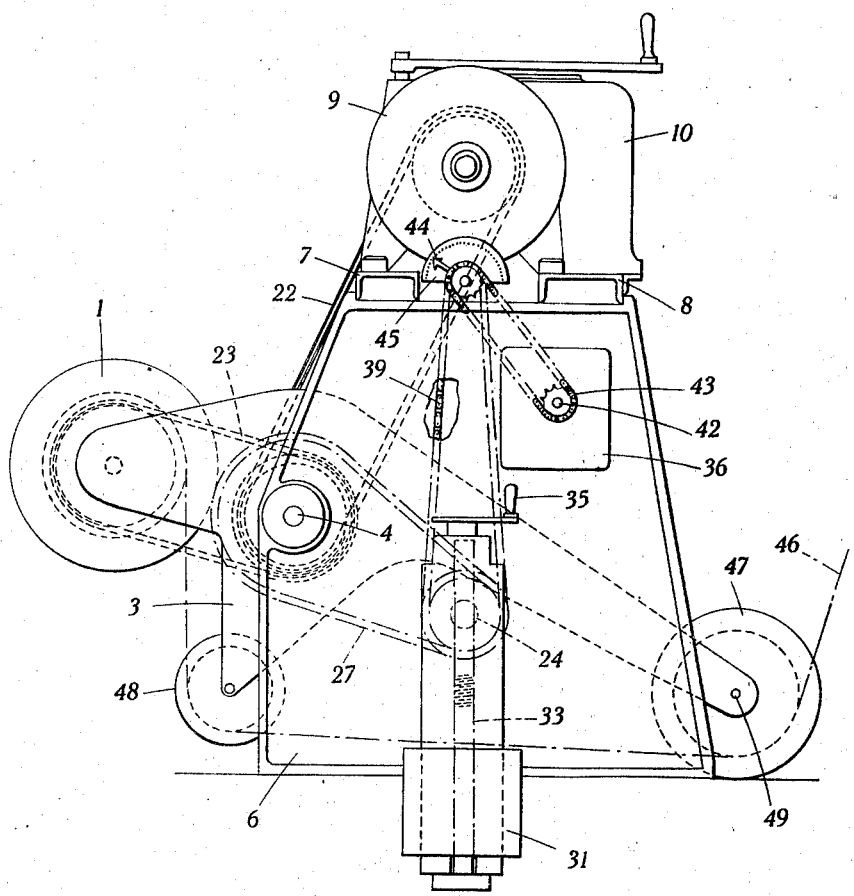
Figure 1 is a side elevation of one form of machine.
Figure 2:
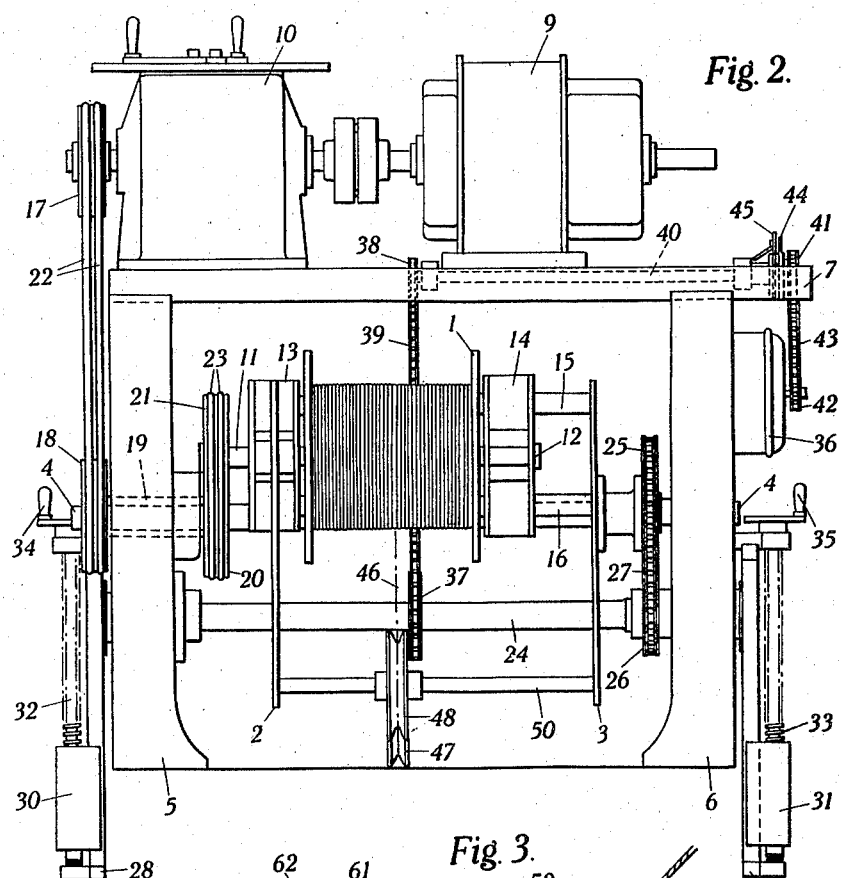
Figure 2 is an end elevation of the same machine.

Referring to Figures 1 and 2, a spool 1 is mounted on a pivoted framework consisting of side plates 2 and 3 supported by a cross shaft 4. This shaft 4 is supported in bearings (not shown) in side members 5 and 6 of the main framework of the machine. Two cross girders 7 and 8, supported by the side members 5 and 6, carry the spool 1 driving motor 9 and a gear box 10. The spool 1 is supported by two centres 11 and 12 which fit into suitable apertures in the ends thereof. These centres are mounted in a fixed head 13 and a movable head 14, respectively. The movable head 14 can slide along rods 15 and 16 which are supported between the side plates 2 and 3 of the pivoted framework. Means are provided for moving the head 14 to bring the centre 12 into and out of engagement with the spool 1. The centre 11 is provided with means for attaching it to the spool 1 so that the spool rotates therewith. The centre 11, and hence the spool 1, are driven from the gear box 10 through pulleys 17 and 18, a hollow shaft 19, through which the shaft 4 passes and pulleys 20 and 21. Since the shaft 4, on which the framework carrying the spool pivots, is co-axial with the hollow shaft 19, through which the drive is transmitted to the spool, the tension of the driving belts 22 and 23 coupling the pulleys 17, 18 and 20, 21, is not affected by pivoting of the framework. The shaft 4, on which the framework is mounted, is coupled to another cross shaft 24 supported between the side members 5 and 6 of the main framework by sprockets 25 and 26 and a chain 27. Frames 28 and 29 carrying counter-balance weights 30 and 31 are rigidly mounted on the ends of the shaft 24. The weights 30 and 31 are free to slide along the frames 28 and 29, and their positions, relative to the frames, are adjusted by rotating threaded shafts 32 and 33, which pass through threaded holes in the weights 30 and 31, by means of handles 34 and 35. The shaft 24 is coupled to a rheostat 36 mounted on the side member 6 of the main framework by means of sprockets 37 and 38 coupled by a chain 39, a shaft 40 and sprockets 41, 42 coupled by a chain 43. The rheostat 36 is connected in the power supply circuit of the motor 9 in such a way that adjustment thereof alters the speed of the motor. A pointer 44, which moves over a fixed scale 45, is mounted on the shaft 40 for indicating the position of the rheostat.

The pivoted framework is shown with the spool in its highest position. As the framework pivots under the action of the weight of the wire, the shaft 4, and hence the shaft 24, is rotated so that the counter-balance weights 30 and 31 are raised. The connection between the shaft 24 and the rheostat 36 is so arranged that, as the spool 5 moves downwards, the resistance of the rheostat is increased and the speed of the motor 9 is decreased.

The wire being wound on the spool passes round pulleys 47 and 48 which are mounted freely on cross shafts 49 and 50 supported between the side plates 2 and 3 of the pivoted framework. Additional guiding means for the wire driven by means coupled to the shaft 11 may also be provided for moving the wire backwards and forwards horizontally between the ends of the spool 1 in order to obtain even winding of the wire. It will be seen that the tension of the wire 46 tends to rotate the pivoted framework about the shaft 4 in the same direction as the gravitational force acting on the spool 1 and the wire wound thereon. If the delivery of the wire to the spool is retarded, thereby causing the tension to increase, the rate at which the framework rotates about the shaft 4 will be increased and the speed of the motor 9 and hence the spool 1 will be decreased. Similarly, a decrease in the tension of the wire will result in a temporary increase in the speed of winding until the normal tension is restored. The turning moment exerted by the counter-balance weights 30, 31 about the shaft 4 increases as the spool moves downwards. A position of equilibrium will therefore be reached for any given weight of spool plus the weight of wire wound thereon and tension of the wire 46. The turning moment exerted by the counterbalance weights 30, 31 can be altered by adjusting the distance of the weights from the shaft 24 by means of the handles 34 and 35.

Figure 3:
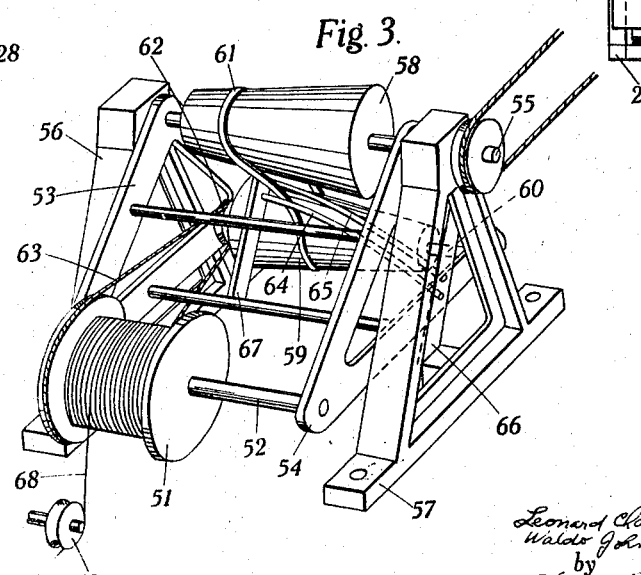
Figure 3 is a perspective view of the second form of machine.

Referring now to Figure 3 of the accompanying drawings, a spool 51 is rotatably mounted on a shaft 52 carried between two triangular side members 53 and 54 of a pivoted framework. This framework pivots about a shaft 55 supported in bearings carried by triangular pedestals 56, 57. The shaft 55 also serves for transmitting the drive from an external source of power to the spool 51. A conical pulley 58 is rigidly mounted on the shaft 55 and is coupled to another conical pulley 59 mounted on a cross shaft 60, forming part of the pivoted framework, by a belt 61. The conical pulley 59 is coupled by a pulley 62 and a belt 63 to the spool 51. The belt 61 passes between two arcuate guide members 64, 65 which are mounted between supports 66, 67 attached to the pedestals 56, 57. The wire 68 being wound onto the spool passes beneath a pulley 69. It is arranged that as the pivoted framework rotates in an anti-clockwise direction about the shaft 55, the guides 64, 65 cause the belt 60 to slide across the conical pulleys 58, 59 in such a way that the speed of rotation of the spool is decreased. Pivoting of the frame will take place under the action of three forces: the weight of the spool 51 and the wire wound thereon, the weight of the conical pulley 59 and the tension of the wire 68. Since the turning moment exerted by the weight of the pulley 59 increases and the turning moment of the spool, about the shaft 55, decreases as the spool moves downwards, for any given weight of spool together with the wire wound thereon and tension of the wire 68, a position of equilibrium will be reached. The guide members are so designed that when the frame is in a position of equilibrium the belt 61 will be in such a position that the wire is wound onto the spool at the desired speed. Additional guiding members similar to 64 and 65 may act on the other part of the belt 61 between the pulleys 58, 59.

If only two guiding rods are used these may operate in three different ways:

(a) Both on the lower part of the driving belt,
(b) Both on the upper part of the belt, and
(c) One on the lower and one on the upper part of the belt.

In cases (a) and (b) the guide rods may either be straight or curved. In case (c) they must be curved, the upper one being concave upwards and the lower one being concave downwards. Effective working may be obtained with curvature of the guide rods in one plane, but greater accuracy of control results if they are curved in two planes so as to have a twisted or helical form. Four rods may be employed, two acting on the upper part of the belt and two on the lower part, and should be given a curved form or twisted form. The use of four rods instead of two will result in a quicker response and greater sensitivity of the control to the movement of the frame.

Instead of rods, plates with inclined edges, or slots, or other equivalent guide arrangement, may be employed.

The angular movement of the frame may be utilised to stop the winding operation when sufficient material has been wound. For this purpose the frame may carry a contact device which normally closes a circuit controlling the driving motor, the circuit being opened when the frame has moved through a predetermined angle to open the motor circuit. The contact device may, for example, have the form of a segment which is centered about the axis of the frame and moves therewith.

In both of the machines described the spool is free to move under the action of three forces which in these examples are moments about the axis of the pivot of the frame. Movement of the frame is caused either by a variation in the tension of the wire being wound onto the spool or by the increase in the weight of the wire on the spool. The angle through which the frame will tilt for various weights of wire upon the spool can be calculated and the control means for the driving means of the spool so arranged that the speed of rotation thereof is suitably regulated.

What we claim as our invention is:

1. Apparatus for winding flexible material in the form of wire, strip or the like onto a holder such as a spool comprising a main supporting frame, a spool carriage movably mounted on said frame, biassing means consisting of at least one counterbalance weight which acts on said carriage to resist downward movement of said spool under gravity in such a way that the spool takes up a position of equilibrium depending on the weight of material wound thereon, driving means for rotating the spool and means for varying the speed at which the spool is rotated in dependence on the position of said spool carriage with relation to said main frame, the whole being arranged as means for rotating the spool at a progressively decreasing speed as the amount of material wound thereon increases.

2. Apparatus for winding flexible material in the form of wire, strip or the like onto a holder such as a spool comprising a main supporting frame, a spool carriage movably mounted on said frame, means for leading said material onto the spool in such a direction that its tension pulls downwardly on the spool, biassing means resisting downward movement of said spool under gravity and said tension in such a way that the spool takes up a position of equilibrium depending on the weight of material wound thereon and said tension, driving means for rotating the spool and means for varying the speed at which the spool is rotated in dependence on the position of said spool carriage with relation to said main frame, the whole being arranged as means for rotating the spool at a progressively decreasing speed as the amount of material wound thereon increases, and for varying this speed in dependence on the tension in the material being wound thereon.

3. Apparatus for winding flexible material in the form of wire, strip or the like onto a holder such as a spool comprising a main supporting frame, a subsidiary frame supporting the spool and a counterbalance weight pivotally mounted on said main frame with the axis of the pivot arranged above a line joining the centres of gravity of the spool and counterbalance weight, driving means for rotating the spool and means for varying the speed at which the spool is rotated in dependence on the position of said subsidiary frame with relation to said main frame, the whole being arranged as means for rotating the spool at a progressively decreasing speed as the amount of material wound thereon increases.

4. Apparatus for winding flexible material in the form of wire, strip or the like onto a holder such as a spool, comprising a main supporting frame, a subsidiary frame, supporting the spool and a counterbalance weight, pivotally mounted on said main frame with the axis of the pivot arranged above a line joining the centres of gravity of the spool and counterbalance weight, means for leading said material onto the spool in such a direction that its tension pulls downwardly on the spool, driving means for rotating the spool and means for varying the speed at which the spool is rotated in dependence on the position of said subsidiary frame with relation to said main frame, the whole being arranged as means for rotating the spool at a progressively decreasing speed as the amount of material wound thereon increases and for varying this speed in dependence on the tension in the material being wound thereon.

5. Apparatus for winding flexible material in the form of wire, strip or the like onto a holder such as a spool comprising a main supporting frame, a subsidiary frame supporting the spool pivoted to said main frame, at least one weight mounted to turn with and about a shaft journalled in the main frame and geared to the pivoted frame, driving means for rotating the spool and means for varying the speed at which the spool is rotated in dependence on the position of said spool carriage with relation to said main framework, the whole being arranged as means for rotating the spool at a progressively decreasing speed as the amount of material wound thereon increases.

6. Apparatus for winding flexible material in the form of wire, strip or the like onto a holder such as a spool comprising a main supporting frame, a spool carriage movably mounted on said frame biassing means consisting of at least one counterbalance weight which acts upon said carriage to resist downward movement of said spool under gravity in such a way that the spool takes up a position of equilibrium depending on the weight of material wound thereon, means for driving said spool including a variable speed gear comprising a pair of cone pulleys coupled by a sliding belt, an inclined guide engaging said belt when relative movement takes place between said spool carriage and main frame, whereby to control the speed of rotation of the spool in dependence on the position of the spool carriage with relation to the main frame, the whole being arranged as means for rotating the spool at a progressively decreasing speed as the amount of material wound thereon increases.

7. Apparatus for winding flexible material in the form of wire, strip or the like onto a holder such as a spool comprising a main supporting frame, a horizontal driven shaft journalled in said frame, a subsidiary frame supporting the spool and a counterbalance weight pivotally mounted on said shaft in such a way that a line joining the centres of gravity of the spool and counterbalance weight pass beneath said shaft, a variable speed gear for driving the spool consisting of a cone pulley mounted on said shaft and coupled by a sliding belt to a second cone pulley mounted on said subsidiary frame and coupled to the spool, a fixed inclined guide mounted on said main frame and engaging with said sliding belt when said subsidiary frame rotates about said driven shaft, the whole being arranged as means for rotating the spool at a progressively decreasing speed as the amount of material wound thereon increases.

8. Apparatus for winding flexible material in the form of wire, strip or the like onto a holder such as a spool comprising a main supporting frame, a horizontal driven shaft journalled in said frame, a subsidiary frame supporting the spool and a counterbalance weight pivotally mounted on said shaft in such a way that a line joining the centres of gravity of the spool and counterbalance weight pass beneath said shaft, means for leading said material onto the spool in such a direction that its tension pulls downwardly on the spool, a variable speed gear for driving the spool consisting of a cone pulley mounted on said shaft and coupled by a sliding belt to a second cone pulley mounted on said subsidiary frame and coupled to the spool, a fixed inclined guide mounted on said main frame and engaging with said sliding belt when said subsidiary frame rotates about said driven shaft, the whole being arranged as means for rotating the spool at a progressively decreasing speed as the amount of material wound thereon increases and for varying this speed in dependence on the tension in the material being wound thereon.

9. Apparatus for winding flexible material in the form of wire, strip or the like onto a holder such as a spool comprising a main supporting frame, a spool carriage movably mounted on said frame, biassing means consisting of at least one counterbalance weight which acts on said carriage to resist downward movement of said spool under gravity in such a way that the spool takes up a position of equilibrium depending on the weight of material wound thereon, a driving motor coupled to the spool and speed control means for said motor mechanically coupled to said spool carriage, the whole being arranged as means for rotating the spool at a progressively decreasing speed as the amount of material wound thereon increases.

10. Apparatus for winding flexible material in the form of wire, strip or the like onto a holder such as a spool comprising a main supporting frame, a subsidiary frame supporting the spool pivoted to said main frame, at least one weight mounted to turn with and about a shaft geared to the pivoted frame, means for leading said material onto the spool in such a direction that its tension pulls downwardly on the spool, a driving motor coupled to the spool and speed control means for said motor mechanically coupled to said shaft, the whole being arranged as means for rotating the spool at a progressively decreasing speed as the amount of material wound thereon increases.

LEONARD CHARLES BANNISTER.
WALDO JOHN CLEMENTS.